United States Patent
Rühle et al.

(10) Patent No.: US 6,604,438 B2
(45) Date of Patent: Aug. 12, 2003

(54) AUTOMATED DRIVE TRAIN FOR A MOTOR VEHICLE AND METHOD OF CONTROLLING A DRIVE TRAIN

(75) Inventors: Günter Rühle, Löchgau (DE); Martin Seufert, Leonberg (DE); Richard Harst, Heilbronn (DE)

(73) Assignee: Getrag Getroebe-und Zahnradfabrik Herman Hagenmeyer GmbH & Cie., Ludwogsburg. (DE)

( * ) Notice: Subject to any disclaimer, the term of this patent is extended or adjusted under 35 U.S.C. 154(b) by 0 days.

(21) Appl. No.: 09/737,898

(22) Filed: Dec. 15, 2000

(65) Prior Publication Data

US 2001/0011484 A1 Aug. 9, 2001

(30) Foreign Application Priority Data

Dec. 17, 1999 (EP) .............................................. 99125202

(51) Int. Cl.⁷ .............................................. F16H 63/00
(52) U.S. Cl. ........................................... 74/335; 74/339
(58) Field of Search ...................... 74/335, 339; 477/79, 477/80; 192/53.34, 53.32

(56) References Cited

U.S. PATENT DOCUMENTS

| | | | |
|---|---|---|---|
| 3,802,293 A | | 4/1974 | Winckler et al. .............. 74/745 |
| 3,834,499 A | * | 9/1974 | Candellero et al. ......... 192/222 |
| 4,185,725 A | * | 1/1980 | Maina ...................... 192/53.31 |
| 4,311,062 A | | 1/1982 | Hamada et al. ............... 74/333 |
| 4,475,639 A | | 10/1984 | Tausend ...................... 192/53 |
| 4,589,532 A | * | 5/1986 | Ito et al. ..................... 192/3.57 |
| 4,603,596 A | * | 8/1986 | Akashi et al. .............. 477/124 |
| 4,727,764 A | | 3/1988 | Klaue .......................... 74/331 |
| 4,830,159 A | * | 5/1989 | Johnson et al. .......... 192/53.32 |
| 5,135,087 A | * | 8/1992 | Frost ...................... 192/53.31 |
| 5,259,260 A | * | 11/1993 | Schneider .................... 74/331 |
| 5,313,856 A | * | 5/1994 | Schneider et al. ............ 477/80 |
| 5,406,861 A | * | 4/1995 | Steeby ...................... 74/336 R |
| 5,445,253 A | * | 8/1995 | Reyes ........................ 192/53.1 |
| 5,492,209 A | * | 2/1996 | Certeza ........................ 74/339 |
| 5,507,376 A | * | 4/1996 | Skotnicki ................. 192/48.91 |
| 5,538,119 A | * | 7/1996 | Johnson, Jr. ................ 192/108 |
| 5,560,461 A | * | 10/1996 | Loeffler .................... 192/53.32 |
| 5,603,241 A | * | 2/1997 | Umeyama ..................... 74/325 |
| 5,603,242 A | * | 2/1997 | Krieger ....................... 74/335 |
| 5,737,969 A | * | 4/1998 | Brown et al. ................. 74/335 |
| 5,761,961 A | * | 6/1998 | Krauss et al. ................. 74/325 |
| 5,785,162 A | * | 7/1998 | Barksdale .............. 192/53.331 |
| 5,901,824 A | * | 5/1999 | Nellums .................. 192/53.31 |
| 5,992,254 A | * | 11/1999 | Machado ...................... 74/335 |
| 6,080,081 A | | 6/2000 | Sauermann et al. ....... 180/53.1 |
| 6,095,001 A | * | 8/2000 | Ruehle et al. ................. 74/331 |

FOREIGN PATENT DOCUMENTS

| | | | |
|---|---|---|---|
| DE | 29 24 656 | 12/1979 | ............. F16H/3/08 |
| DE | 198 59 458 A1 | 6/1999 | ............. F16H/3/08 |
| EP | 0 479 737 A1 | 4/1992 | ........... F16H/61/06 |
| EP | 0 695 665 A1 | 2/1996 | ........... B60K/41/06 |
| JP | 58054260 | 3/1983 | ............. F16H/5/66 |
| JP | 8 277890 | 10/1996 | ............. F16H/3/12 |

\* cited by examiner

Primary Examiner—Rodney H. Bonck
Assistant Examiner—David D. Le
(74) Attorney, Agent, or Firm—Shook, Hardy & Bacon L.P.

(57) ABSTRACT

An automated drive train is provided for a motor vehicle comprising a single friction clutch, which is actuatable by a first actuator. A step transmission connected to the output side of the friction clutch comprises wheel sets to engage and disengage forward gears. A plurality of partial load positive gear shift clutches are provided which each include a synchronization means and which are actuatable by means of second actuators for engaging and disengaging the gears. A controller is provided for controlling the actuators such that the drive train is controlled to carry out a gear change under one of the three possible modes (A, B, C) depending on the conditions of the gear change to be made, wherein the three possible modes (A, B, C) of gear changes take place with an opened (C), a closed (B) or with a slipping (A) friction clutch.

6 Claims, 4 Drawing Sheets

AUTOMATED DRIVE TRAIN FOR A MOTOR VEHICLE AND METHOD OF CONTROLLING A DRIVE TRAIN

BACKGROUND OF THE INVENTION

1. Field of the Invention

The present invention relates to an automated drive train for a motor vehicle comprising a single friction clutch, which is actuated by an actuator and is connected at the input side to the motor of the vehicle, and a step transmission connected to the output side of the clutch. The transmission comprises a first plurality of wheel sets for engaging and disengaging corresponding forward gears and a corresponding plurality of positive gear shift clutches, each having synchronization means. The gear shift clutches can be actuated for engaging and disengaging the gears by a second plurality of second actuators. A controller coordinates the control of the first actuator with the second actuators.

The invention further relates to a method for controlling a drive train of a motor vehicle, which comprises a first plurality of wheel sets for engaging and disengaging the corresponding forward gears and a corresponding plurality of positive gear shift clutches, each having synchronization means. The gear shift clutches can be actuated for engaging and disengaging the gears by a second plurality of second actuators. When changing gears, the first actuator is controlled to be coordinated to the second actuators.

2. Description of Related Art

Such an automated drive train and such a method are disclosed in WO93/10378. In transmissions for motor vehicles, particularly passenger vehicles, one distinguishes generally between automatic transmissions and manual transmissions. The former comprise a hydro-dynamic torque converter and a plurality of planet wheel sets, which are controlled by overlapping braking and coupling means, so that no interruption of the driving force occurs when changing gears.

Manual transmissions in contrast are step transmissions with a layshaft arrangement. When changing gears, an interruption of the traction force occurs between the time one gear is disengaged and a new gear is engaged, because the friction clutch associated with the transmission is opened (typically a starting clutch configured to be a dry clutch). Thereby, the motor is completely decoupled from the transmission and therefore also from the vehicle drive wheels.

It is standard in automotive transmissions of today that a locking synchronizer is provided for each positive gear shift clutch for engaging and disengaging gears. A locking synchronizer comprises a synchronizing means (typically a friction coupling) through which a matching of the rotary speed between a wheel set and a shaft (drive shaft) takes place when the friction clutch is open, i.e. not under load. A locking means of the synchronizer prevents or impairs a positive engagement of the gear shift clutch (i.e. the engagement of the gear) until a matched speed is nearly attained.

While the traction force decrease when changing gears by manual shifting is considered to be not particularly unpleasant, the associated "nicking" of the automobile is considered to be less comfortable when the step transmission is automated. In automated step transmissions, the actuation of the friction clutch and gear shift clutches is undertaken by a controller which coordinates actuators, instead of being done by the hand and foot. The traction force interruption is found to be uncomfortable, because with an automated step transmission, the driver is not occupied during gear changing.

Various attempts have been made to mitigate this problem. In the step transmission known from WO93/10378, an attempt is made to shorten the duration of the traction force decrease interruption. This is achieved by two measures. In the transmission disclosed there, two gears, not in sequence with one another, are arranged in one shifting group. In addition, the locking synchronizers of more than one group are activated simultaneously when changing gears. In other words, when disengaging the previous gear (old gear), the synchronization to the rotary speed of the following gear takes place not only with the associated locking synchronizer, but in addition with the locking synchronizer of an additional gear. The times associated with shifting are to be reduced, which achieves shorter shifting times. The duration of traction force decrease is therefore reduced.

A further principle to reduce the traction force decrease is disclosed in the German patent application DE 44 01 812. Instead of a single friction clutch at the input side, a double clutch system is provided. One clutch of the double clutch system associated with the transmission input shaft is for the gear ratios one to five, while the second clutch is associated with the highest gear, namely the sixth gear. During shifting in the lower gears, where the first clutch is first completely opened in known manner and then closed after the shifting, the second clutch, normally open, is closed for a short period, so that the torque of the sixth gear is supplied to the drive shaft of the transmission for a short time. However, when shifting in the lower gears, a considerable traction force decrease still occurs because the torque of the sixth gear is considerably less than that of the lower gears.

The German patent application DE 29 24 656 discloses a further shift transmission in which a single friction disconnection clutch is provided at the input side and in which the wheel set for the second gear does not have the conventional gear shift clutch, but has a wet multi-disc friction clutch. Furthermore, the idler of the first gear is mounted freely on the corresponding shaft. Thus when changing from the first to the second gear, the torque of the motor at the input side of the transmission can be applied to the second gear without opening the friction disconnection clutch and without decrease of the traction force. The change in higher gears however takes place with traction force decrease since for these changes the input side disconnection clutch must be opened.

An automated change speed transmission is disclosed in the German patent application DE 197 35 759. The gear shift clutches for engaging and disengaging the gears are configured as pure positive clutches in the form of claw or draw key couplings. Shifting takes place in that the relative angular position of the elements to be connected is monitored and a signal is output in the ready condition. One gear shift clutch is then opened by a highly dynamic hydraulic system and a new gear shift clutch is closed. When actuating the gear shift clutches, an input side friction disconnection clutch is held in slip condition.

In addition, an automated step transmission with traction force support is disclosed in the German patent DE 195 48 622.

Finally, the so-called "genuine" double clutch transmissions are known, for example from the German patent DE 38 12 327. Two parallel friction clutches are provided on the input side of the transmission. The two clutches are associated with two parallel branches of the transmission, where the parallel interconnection is achieved with a hollow shaft construction. The gears are alternately located on one and then the other drive branch, so that in overlapping operation, the motor torque at the input side can transfer from one branch to the other branch without any traction force decrease.

The mentioned WO93/10378 suffers from the drawback that the central clutch is opened when changing gears so that an uncomfortable decrease in the traction force takes place when shifting, although the interruption time can be optimized. In the transmission of DE 44 01 812, the construction is comparatively complicated due to the double clutch arrangement at the input side. Further, the traction force support can only maximally transmit the torque of the sixth gear to the drive wheels. The complexity of DE 29 24 656 is also considerable, in particular due to the free wheel for the first gear. The concept of DE 197 35 759 cannot completely avoid traction force interruption and requires a very stable construction. The true double clutch transmission, as disclosed in DE 38 123 27 requires not only constructive complexity due to the two clutches, a comparatively long hollow shaft construction is necessary which makes the transmission expensive.

In view of the above, the object of the present invention is to provide an automated drive train and a method of controlling a drive train for a motor vehicle of the mentioned type, in which gear changing is as fast as possible and in which the greatest possible traction force support can be achieved, where only one friction clutch is present, provided as a disconnection clutch.

SUMMARY OF THE INVENTION

The object is achieved with the mentioned automated drive train, by providing synchronization means suitable for synchronizing under partial load and a controller for controlling actuators such that at least one type of gear change takes place without the clutch being completely open. In the mentioned method for controlling the drive train, the synchronization means are suited for synchronizing under partial load and the actuators are controlled such that the friction clutch is not completely opened for at least one type of gear change.

According to a further aspect of the invention in the mentioned method, the same drive train is operated in one of three possible modes to carry out the gear change, depending on the conditions of the gear change to be made, wherein the three possible modes include gear changing with an opened friction clutch, a closed friction clutch or a slipping friction clutch.

The object is completely achieved in this manner.

By departing from the idea that the input side clutch configured as a separating clutch must always be open in a step transmission during the gear change, the clutch is not completely opened in the first aspect of the present invention, but remains either completely closed (mode B) or is operated in slip condition (mode A). The drive connection between the motor of the vehicle and the transmission is not released at any time during the gear change.

With suitable configuration of the gear shift clutches, shifting can take place such that when the gear to be disengaged is initially still engaged the torque is completely transferred to the gear shift clutch of the gear to become engaged. This results in a condition of substantially no load for a short time on the gear shift clutch of the gear to be disengaged, so that this gear is easily disengaged in this short time interval. In the following synchronizing phase of the gear changer for the gear to be engaged, the input side friction clutch remains at least partially closed, so that the torque from the motor is transferred via the friction clutch working in slip operation and via the synchronization means for the gear to be engaged to the drive wheels of the vehicle.

With this feature, that the synchronization means are suited for synchronizing under partial load, it is possible to configure the step transmission of the present drive train without further synchronization means apart from the respective gear shift clutches. This has the advantage that gear shifting under partial load can be carried out both when shifting upwardly and shifting downwardly. In contrast, a central wheel set brake would otherwise be necessary for shifting upwardly and for shifting downwardly an additional drive means would be necessary.

The automated drive train and the corresponding method provide gear shifting according to a first aspect of the invention with traction force support, in contrast to WO93/10378. In contrast to DE 197 35 759, the gear shifting takes place without traction force interruption at any time. Further, it is not necessary to provide two friction clutches at the input side and a hollow shaft construction is not required. Finally, the gear shift clutches of the drive train are configured to make a positive engagement, so that the entire actuator mechanism with an engaged gear is relieved and no additional energy is required. This is also an important advantage for reasons of reliability and efficiency.

According to the further aspect of the invention, the same gear change of a drive train can be carried out in one of three different modes depending on the respective conditions. Thus, depending on the respective conditions, more comfortable or more sporty shifting can be carried out.

Preferably, at least one of the second actuators is configured to control two gear shift clutches. This feature reduces the complexity of the actuator system as a whole for automating the drive train. Preferably, the two gear shift clutches are associated with gears which are not in sequence with one another. In other words, it is achieved that neighboring gears are actuated by different actuators and therefore can be engaged and disengaged independently from one another. The greatest possible flexibility in the control of the actuators of the transmission is achieved.

Particularly preferred is when the further two gears lie between two gears to be shifted. This feature has the advantage that two gears are always operated by one actuator, which in practice are never shifted in sequence. Since the present arrangement does not concern a sequential transmission, the sequence of the gears when shifting is not limited to neighboring gears. Thus it is generally possible not only in manual transmissions but also in automated drive trains to carry out shifting directly from one gear to the gear following the next gear, for example to shift from the fourth gear to the sixth gear.

With the feature that two further gears lie between the two gears being operated by one actuator, shifting without traction force interruption is possible not only from one gear to the next gear, but also the gear after next gear. Only shiftings using two gear shift clutches, which are operated by one actuator, cannot be performed with this shifting strategy, so that a traction force interruption occurs. However, it has been shown that precisely those shiftings to a gear second following the next gear are practically never used by a driver.

The shift transmission preferably comprises six forward gears and three second actuators when further all three second actuators are configured to control two gear shift clutches each and when finally each of the two gear shift clutches is associated with two gears which are not neighboring one another. With this feature it is possible to carry out all gear shiftings of a six gear transmission from one gear to the respective next gear while providing traction force support.

It is particularly preferred when precisely two further gears lie between all of the non-neighboring gear pairs. This is of advantage for the mentioned reasons, because a driver in practice will never require a shifting from one gear to the gear second following the next gear. All other shiftings can be carried out with traction force support. For a transmission with exactly six gears, this rule results in that the non-neighboring gear pairs are the gears 1 and 4, the gears 2 and 5 and the gears 3 and 6.

The synchronization means preferably provide a cone synchronization. Cone synchronizers are proven synchronizing elements and it is comparatively easy to configure such elements for the drive train of the present invention. The cone synchronizers preferably comprise a multiple cone. With a multiple cone, the shifting force of the synchronization means can be reduced on the whole. The synchronizing process can be accelerated.

In a further preferred embodiment, the cone synchronizers comprise a cone angle of more than 6°. The synchronization means can be better controlled and self-locking can be avoided.

In a further preferred embodiment, the synchronization means comprise multi-disc synchronizers. Multi-disc synchronizers are easily controllable and are better adjustable.

In a preferred embodiment, the gear shift clutch comprises an asymmetric tip of the gear teeth on a sliding sleeve actuated by the actuator. The sliding sleeve and the coupling body are better passed through each other under load. Further preferred is when the gear shift clutch comprises a tooth profile without back cutting on the sliding sleeve actuated by the actuator or on the coupling body. In this manner, the gear being actuated by this gear shift clutch is easier to disengage.

In a further preferred embodiment, the gear shift clutch comprises a tooth profile with back cutting on its coupling body or on the sliding sleeve. This feature does not impair the disengagement of the gear under load.

It is of advantage to provide a central lubrication for the wheel sets and the associated gear shift clutches. No losses due to splashing of the gear set occur as does with an immersion lubrication. The shift elements are better and more reliably supplied with oil. Further, the central lubrication ensures that the heat arising by synchronization under load is better dissipated.

In the method of the present invention, it is preferred during a gear change in modus A, B when a synchronizer of the gear to be engaged is operated in slip condition before disengaging the presently engaged gear, to take up the torque present at the input side of the transmission. With this feature, the gear shift clutch of the engaged gear is free of load for a time interval, so that this gear can also be disengaged under load.

Of advantage before disengaging the engaged gear is to provide a further synchronizer in addition to the synchronizer of the gear to be engaged. The further synchronizer is that of a gear not involved in the gear change. The further synchronizer is operated in slip condition to partially take up the torque present at the input, for engaging the gear to be engaged.

In a particularly preferred embodiment, the gear shift clutch associated with the engaged gear is biased in the disengaging direction before its disengagement. With the biasing, the gear to be disengaged "jumps" out as soon as the load free condition is reached.

In a further preferred embodiment, the friction clutch is partially opened during the shifting (mode A) and/or the torque provided by the motor is reduced by means of a motor actuator (modes A, B). The torque present at the input side of the transmission is reduced to prevent overloading of the synchronizer of the gear to be engaged. The motor actuator can normally interact in the motor management to reduce the input torque by "electronic gas reduction".

Finally it is preferred in modes A, B that the torque input to the shift transmission, after having disengaged the previously engaged gear, is reduced for a short time, after reaching the synchronization speed and during the engagement of the gear to be engaged. This reduces or completely avoids differences in rotary speeds when transferring the torque from the synchronizer to the idler of the associated wheel set.

Further advantages and features will become apparent from the following description of preferred embodiments. It will be understood that the above-mentioned features and those to be discussed below are not only applicable in the given combinations, but may also be present in other combinations or taken alone without departing from the scope of the present invention.

BRIEF DESCRIPTION OF THE DRAWING

Embodiments of the invention are illustrated in the drawings and will be described in more detail below.

DESCRIPTION OF THE PREFERRED EMBODIMENT

Figure 1:
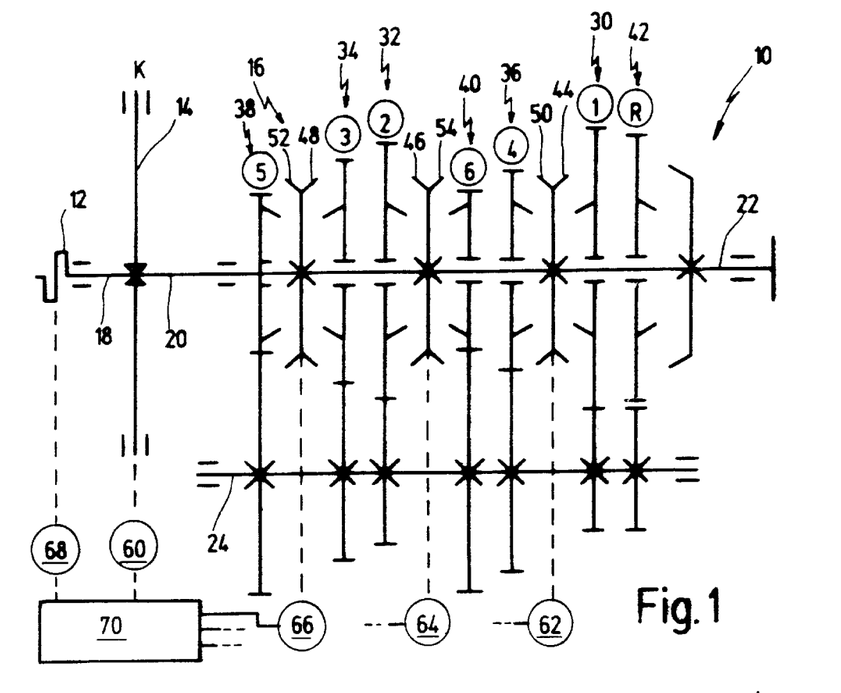
FIG. 1 shows a schematic transmission of an automated drive train according to a first embodiment.

A drive train for an automobile is shown in FIG. 1 and generally indicated with the numeral 10. The drive train 10 comprises a motor 12, in particular a combustion engine, a single friction clutch 14 configured as a disconnection and starting clutch, and a step transmission (shift transmission) 16.

A motor drive shaft 18 is connected to an input element (not shown) of the clutch 14. An output element (also not shown) of the clutch 14 is connected to an input shaft 20 of the transmission.

The shift transmission 16 has the standard construction for longitudinal assembly in a motor vehicle and comprises a transmission output shaft 22 arranged to be concentric with the input shaft 20. Numeral 24 indicates a layshaft (an auxiliary shaft) arranged parallel to the shafts 20, 22.

The shift transmission 16 comprises seven wheel sets 30, 32, 34, 36, 38, 40, 42 for the forward gears one to six and a reverse gear R. The wheel set 38 for the fifth gear establishes constant engagement between the input shaft 20 and the auxiliary shaft 24. The fifth gear is provided as a direct gear, in which the input shaft 20 and the output shaft 22 are directly interlockingly connected to one another.

Starting from the constant engagement wheel set 38, the idlers of the wheel sets are arranged on the output shaft 22 in the sequence of the wheel set 34 for the third gear, the wheel set 32 for the second gear, the wheel set 40 for the sixth gear, the wheel set 36 for the fourth gear, the wheel set 30 for the first gear, and the wheel set 42 for the reverse gear. The corresponding fixed wheels are not given reference numerals in the figure; they are connected to be fixed against rotation to the auxiliary shaft 24.

Gear shift clutches (gear changers) 44, 46, 48, 50, 52, 54 are provided for shifting the forward gears one to six. As can be seen in the schematic diagram of FIG. 1, two gear changers are combined in pairs respectively so that they can be actuated in respectively opposite directions by means of an actuator per gear changer pair.

The actuators of the automated drive train 10 include a first actuator 60 for operating the clutch 14. Three second actuators 62, 64, 66 are provided for the shift transmission 16. A third actuator 68 has the purpose of influencing the motor 12. The total of five actuators are controlled by a central controller 70. The actuator 62 operates the gear changers 44, 50 for the first and the fourth gear. The actuator 64 operates the gear changers 46, 54 for the second and sixth gear. The actuator 66 operates the gear changers 48, 52 for the third and the direct fifth gear.

As is apparent, the wheel sets 30 to 40 and the corresponding gear changers 44 to 54 are arranged such that no actuator 62, 64, 66 operates consecutive gears. Instead, the actuator 62 actuates the first and the fourth gear, the actuator 64 the second and the sixth gear and the actuator 66 the third and the fifth gear. These are pairs of gears, between which a gear change is never required by the driver in practice. In other words, it is not common in practice to shift from the first to the fourth or from the second to the sixth gear. In contrast, normal gear changes are from one gear to the next adjacent gear, i.e. from one to two, two to three, etc.

The mentioned arrangement of the wheel sets and gear changers is particularly suited for these type of gear changes as will be described below.

Figure 2:
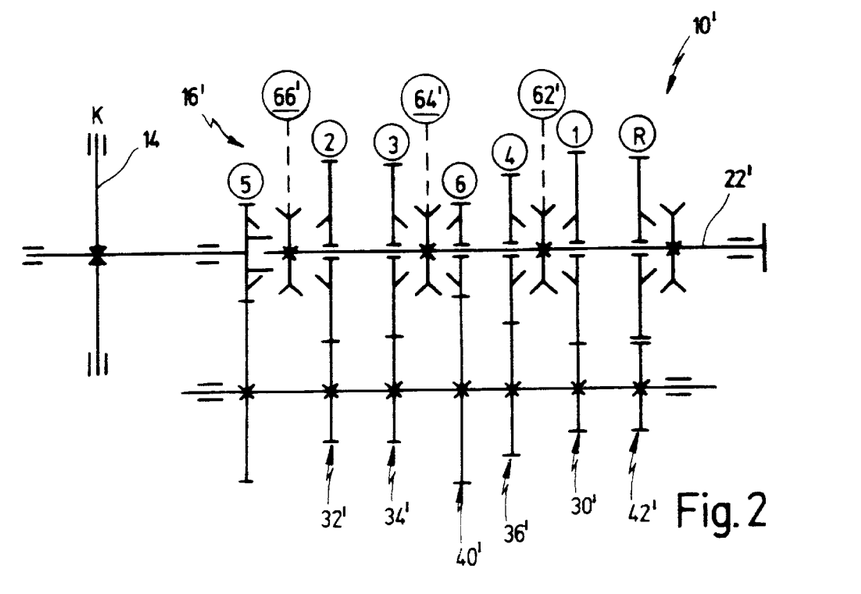
FIG. 2 shows a schematic transmission of an automated drive train according to a second embodiment.

An alternative form of a drive train 10' of the present invention is illustrated in FIG. 2. The basic construction is identical to the drive train 10 of FIG. 1. Where no separate numerals are indicated in FIG. 2, this embodiment comprises the same elements as in FIG. 1. In the step transmission 16' of the drive train 10', starting from the constant engagement wheel set 38' for the fifth gear, the idlers of the wheel sets 32', 34', 40', 36', 30', 42' for the gears two, three, six, four, one and R are arranged in this sequence along the output shaft 22'. The corresponding fixed wheels are also fixed against rotation on the auxiliary shaft.

One recognizes that only the wheel sets for the second and third gears have been interchanged, so that an actuator 64' now provides engagement of the third and the sixth gear. An actuator 66' provides engagement of the second and fifth gears. This embodiment is suitable for all gear changes with the exception of the gear change from one to four, two to five and three to six. One recognizes that none of these three gear changes are significant in practice, whether shifting upwardly or downwardly.

In all cases, one actuator serves for one gear and the third adjacent gear. The gear changers 44 to 54 in both the transmission 16 and 16' are equipped with cone synchronization means. Although not shown in the figures, each of the cone synchronization means being of a multiple cone type and having a cone angle of greater than 6.5°, whereby the synchronization means can be better adjusted and where self-locking is avoided. Further, each pair of gear changers is provided with a sliding sleeve, slidable in axial direction, which is actuated by a shifting fork. Drive coupling elements (stop bodies), optimized with respect to wear, are provided since the synchronization means as described below are subject to higher forces than that in conventional shift transmissions.

Further, the gear teeth of the sliding sleeves of the gear changers have an asymmetric tip to achieve a better engagement of the sliding sleeve and the coupling body under load. To achieve a simpler gear disengagement also under load, the gear teeth of the sliding sleeve are parallel and formed without back cutting. On the other hand, the coupling body of the corresponding synchronization means is formed with back cut teeth. Conversely, the teeth of the sliding sleeve can be back cut and those of the coupling body can be provided without back cutting.

The actuators 60, 62, 64, 66 can be electromechanical, hydraulic or pneumatic actuators. Electromechanical actuators are however preferred. Instead of providing the synchronization means as cone synchronizers, multi-disc synchronization means are alternatively possible.

In addition, the shift transmissions 16, 16' are each provided with central lubrication means (not shown) for the wheel sets and the shift elements of the gear changers, where losses due to splashing of the wheel sets, such as those in immersion lubrication, are avoided. Furthermore, the shift elements are better and more reliably supplied with oil. Moreover, of particular significance is that the heat developed by synchronization under partial load is more efficiently dissipated. The central lubrication can be provided in a manner known per se by a mechanically or electrically driven pump.

As can be taken from the above, the gear changers 44 to 54 are positive gear changers, which in shifted condition require no additional energy.

Figure 3:
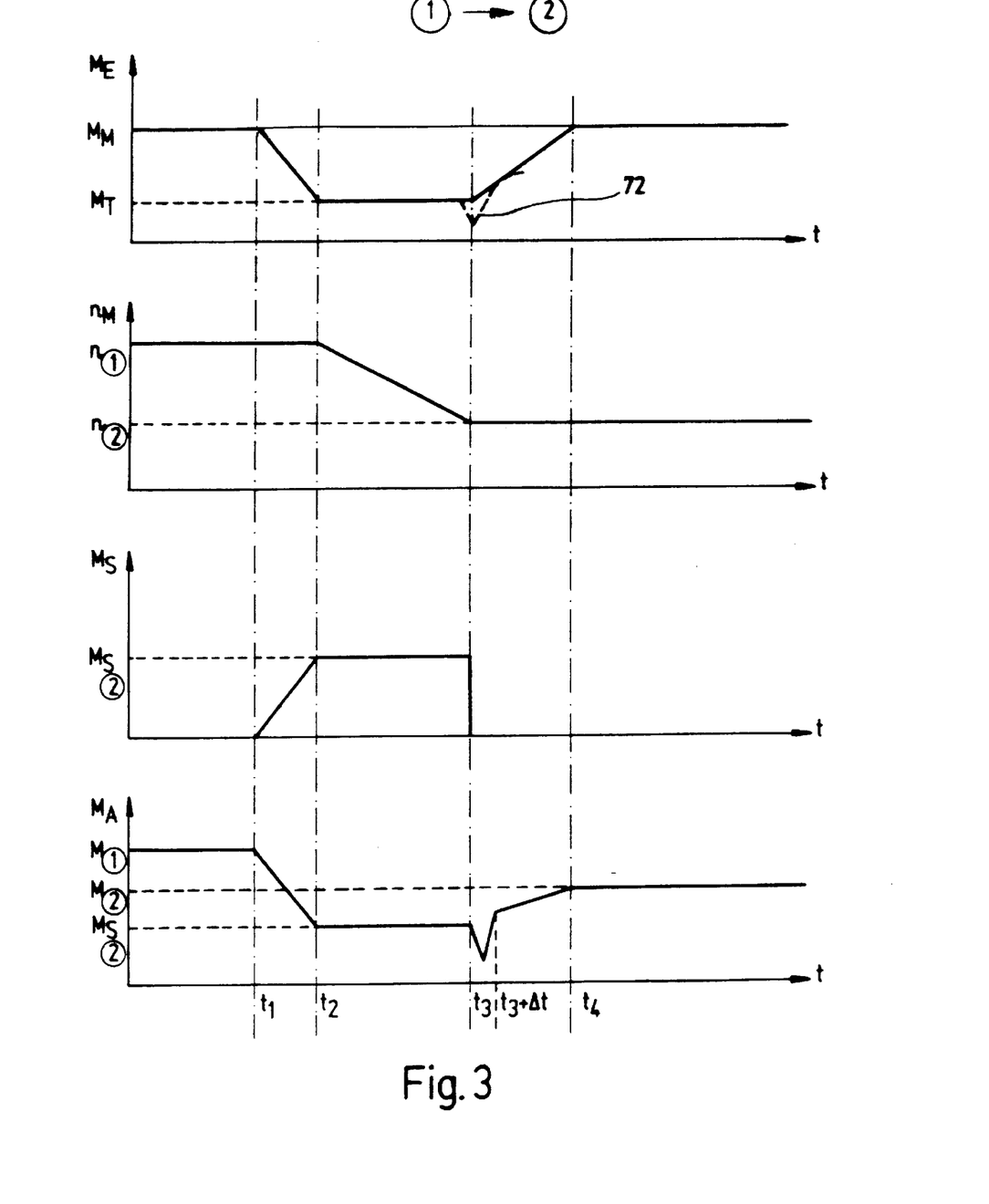
FIG. 3 shows time flow diagrams of an exemplary gear change from one to two by means of the method of the present invention.

The operation of the drive trains 10, 10' in FIGS. 1 and 2 will now be described with reference to FIG. 3. Four flow diagrams are shown in FIG. 3 arranged above one another. The upper diagram shows the torque $M_E$ present at the input side of the transmission. The rotary speed $n_M$ of the drive shaft 18 of the motor is shown therebelow. The so-called synchronizing torque $M_S$ is illustrated thereunder, which is received by the synchronization means of the gear changer of the gear to be engaged. Finally, FIG. 3 at the bottom shows the drive torque $M_A$ present at the output side of the transmission. FIG. 3 relates to a change from the first to the second gear.

The following description of a gear change with the drive trains 10, 10' however is applicable in the same sense for all other upward and downward gear changes.

At the time $t_1$, the vehicle is operated in the first gear and the clutch 14 is closed. Consequently, the full motor torque $M_M$ is present at the input side of the transmission, at a speed of $n_1$. A command for disengaging the first gear and engaging the second gear can be given for example manually by the driver by means of a button or a gear shift lever, where the mechanical events are converted into electrical command signals. Such command signals can however also be generated in a controller 70, for example when the controller recognizes from vehicle parameters and a certain gas pedal position that a change in gears is required.

When a command signal is then generated at the time $t_1$ for a change to the second gear, the following processes take place up until the time $t_2$. The actuator 64 of the drive train 10 (actuator 66' of the drive train 10') is activated to load the synchronizer for the gear changer 46 of the second gear. The synchronizer of the gear changer 46 of the second gear gradually takes on a synchronizing torque $M_S$. At the same time, the torque $M_E$ at the input side is reduced either by operation of the electronics of the motor 12 by means of the actuator 66 and/or by partially opening the clutch 14 by means of the actuator 60. Thus the torque $M_E$ falls until the time $t_2$, however, does not become 0, so that the clutch 14 is not completely opened.

Parallel to these processes, which is not illustrated in FIG. 3, the actuator 62 is biased, i.e. a force in the direction of disengagement of the first gear is exerted on the gear changer 44 for the first gear. Since during the time interval between $t_1$ and $t_2$ a certain portion of the torque $M_E$ is transferred via the gear changer 44 of the first gear, this biasing of the associated actuator 62 does not immediately cause the first gear to be disengaged. Only when the torque $M_E$ is nearly completely taken up by the synchronizer of the gear changer 46 of the second gear ($t_2$) does the first gear "jump" out due to the biasing of the actuator 62.

In the phase between $t_2$ and $t_3$, a synchronization follows with the synchronizer of the gear changer 46 of the second gear. This synchronization takes place under partial load, since a reduced, but non-zero partial torque $M_T$ is present during this interval at the input side of the transmission.

At the time $t_3$, the synchronizing speed for the second gear is reached. The associated sliding sleeve is now shifted through, thus leaving the synchronizer body, and becomes positively locked with the coupling body of the second gear. This occurs extremely quickly in a time interval indicated by $\Delta t$. However, to avoid the synchronization in this time interval from being lost, i.e. to avoid a difference in rotary speed reoccurring between the synchronized elements, one can further reduce the torque at the input for a short period. This takes place either by a corresponding action of the actuator 60 to further open the clutch 14, or by operating the motor management with the actuator 68. This short reduction of the input torque $M_E$ is shown in FIG. 3 at the numeral 72.

Under certain circumstances, this feature can be relinquished when it can be ensured that a reliable and comfortable switching of the gear changer of the gear to be engaged (here the second gear) is present, for example by providing an asymmetrical tip on the teeth of the sliding sleeve.

At the time $t_3+\Delta t$, the second gear is engaged in positive manner. The clutch 14 can now be completely closed, so that at the time $t_4$ the full torque $M_M$ of the motor is present at the input side.

For the next gear change from the second to the third gear, the actuator 64 (actuator 66' for 10') is biased in the disengaging direction and the actuator 66 (actuator 64' in 10') is activated to actuate the synchronizer of the gear changer 48 of the third gear.

One can speak of a "beginning synchronization" because between the times $t_1$ and $t_2$, the synchronizer of the gear to be engaged is activated, while the gear to be disengaged is still engaged, i.e. it always operates in the slip condition. It will be understood that this beginning synchronization can only occur with synchronization means which are not actuated by the actuator of the gear to be disengaged. Therefore, it will also be understood that in addition to the beginning synchronization by the synchronizer of the gear to be engaged, a parallel further beginning synchronization by the synchronizer of a further gear can take place, as long as the associated actuator does not correspond to the gear to be engaged or the gear to be disengaged.

Figure 4:
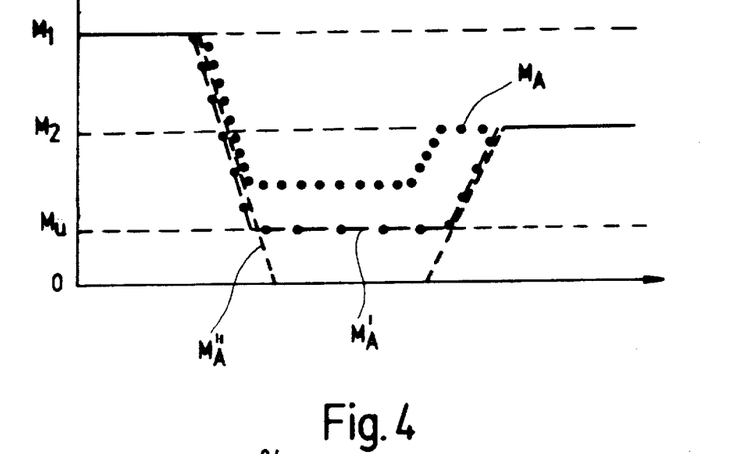
FIG. 4 shows a comparison of a gear change according to the invention with the prior art in qualitative manner.

A comparison of the gear changing strategy to that of the prior art is given qualitatively in FIG. 4. A conventional shifting with an automated drive train is shown as $M_A''$ in which the central clutch 14 is opened before disengaging one gear. Thus the input torque and therefore the drive force (traction force) of the vehicle reduces to zero. Only when the new gear is engaged is the clutch 14 closed so that a torque is again transmitted. Thus at the output side of the transmission, the torque $M_1$ of for example the first gear is present up until the disconnection clutch is opened. After changing gears and again closing the friction clutch, the torque $M_2$ of the second gear is present. With an automated drive train having traction force support via a parallel branch, for example with the highest gear, the drive torque $M_A$ does not go to zero in the mentioned time interval, but a bridging torque $M_U$ of another gear is transmitted during this time, for example the torque of the sixth gear. This is indicated by $M_A'$.

According to the invention, indicated by $M_A$, not only can a higher torque be transmitted in the bridging time interval, but the gear change can also take place much faster because far fewer elements need to be actuated and therefore the shifting times are much less.

As can be taken from the above, the gear changers including the synchronization means must be formed as partial load shifting elements. Since the drive train always remains under (partial) load during the gear change, no relaxation jolt occurs, i.e. a better vibration and noise behavior results. Since the gear changers are configured to be positive (form-locking), no additional energy is required in the shifted condition.

It will be understood that the asymmetric form of the tips of the gear teeth of the sliding sleeve is provided such that it only acts in one rotary direction, preferably when shifting upwardly. For this reason, the asymmetric form should be limited to those gears for which the largest jump in torque is to be expected, i.e. to the second and third gears.

The torque to be transmitted can be influenced by a modulation of the clutch 14 during the gear changing process. When shifting upwardly, the rotational kinetic energy of the motor can be utilized for forward drive.

Figure 5:
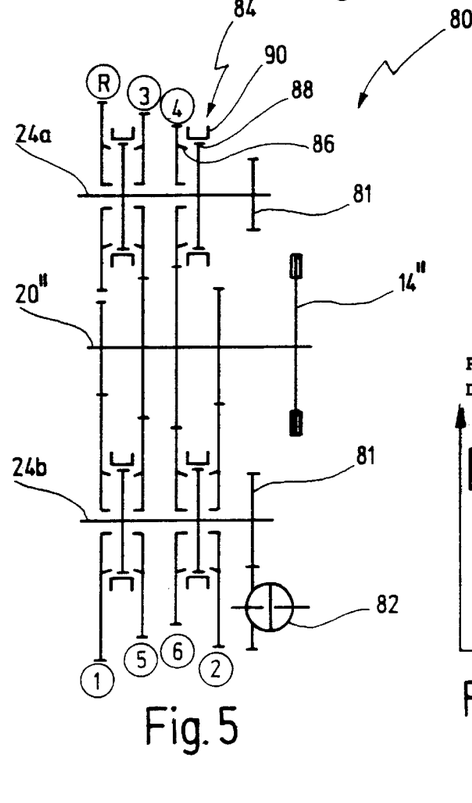
FIG. 5 shows a transmission diagram of an automated drive train according to a third embodiment.

FIG. 5 shows a third embodiment of the drive train according to the present invention, which is generally indicated by the numeral 80. The drive train 80 comprises a transmission with six gears in a construction with three shafts for cross-wise assembly in a motor vehicle. The construction of the drive train 80 includes a transmission input shaft 20", which can be connected with a single clutch 14" formed as a dry friction clutch to a motor (not shown) of the vehicle. The drive train 80 further comprises two auxiliary shafts 24a, 24b. The idlers of the wheel sets for the reverse gear, the third gear and the fourth gear are provided on the auxiliary shaft 24a. The idlers of the gear wheels for the first, fifth, sixth and second gear are arranged on the auxiliary shaft 24b. The auxiliary shafts 24a, 24b are connected to a schematically illustrated differential 82 via a drive wheel set 81.

An actuator 84 is associated with the wheel set for the fourth gear. The gears 1 and 5, 2 and 6 as well as 3 and R are shifted respectively in pairs by means of one actuator. Each of the actuators is constructed like the actuator 84 for the fourth gear and comprises a synchronization means in the form of a conical friction element 86 and a positive clutch 88, which is actuatable by means of a sliding sleeve 90. In the present embodiment, synchronization means is to be understood as any type of friction element which is capable of transferring a torque in slip condition. Further, the synchronization means, as its name indicates, should be suitable for matching the rotary speeds. However, it is not necessary that the synchronization means achieve a complete matching of the speeds. Moreover, under certain conditions, it can even be appropriate to configure the synchronization means such that shifting the positive coupling 88 is also possible when a certain difference in rotary speed still exists.

A synchronization means in the sense of the present invention, whether it is the synchronizer 86 of the gear changer 84 or a synchronizer of the gear changers 44 to 54 of the drive train 10 in FIG. 1, is configured such that a process of matching the speeds is carried out in slip operation under partial load. The capability of operating under partial load is to be understood in that the synchronization means do not transmit the full maximum motor torque in slip operation, multiplied by the gear ratio of the respective gears, but at most 75% thereof. A value of 75% is more likely to be achievable for smaller automobiles, whose motor generates a comparatively smaller torque. For automobiles with higher torques this percent value can also be smaller, for example 50% or even 30%.

Figure 6:
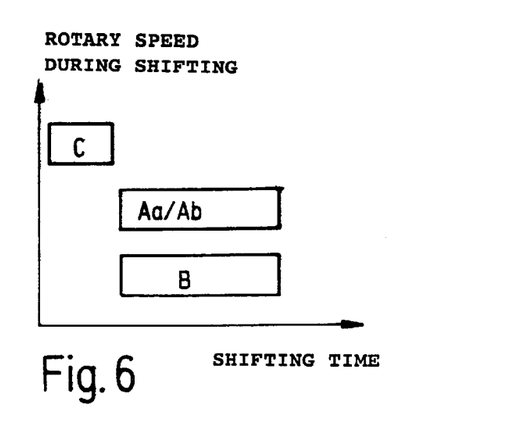
FIG. 6 shows a diagram illustrating criteria for certain strategies to be used in gear changing.

FIG. 6 shows a diagram of the rotary speed during shifting as a function of the shifting time. The shifting rotary speed is to be understood as the rotary speed of the motor of the vehicle which is present when introducing the gear change. The shifting rotary speed can alternatively be understood as a difference speed between the elements (idler and shaft) which are to be connected in a positive manner with one another in the gear change. The shifting time is the time interval from detection of a command to change gears up until the condition is reached where the new gear is engaged and the clutch is completely closed.

Three regions are indicated in the diagram of FIG. 6, which represent various shifting strategies to which certain shifting times and shifting rotary speeds are associated. The boundry conditions for a gear change include the shifting time and the shifting rotary speed.

The strategy B represents a gear change with closed clutch at a low shifting rotary speed. The strategy C represents a gear change with opened starting clutch and at high shifting rotary speeds. The strategies A (including Aa and Ab) take place at intermediate shifting rotary speeds with slip operation of the starting clutch. While the strategies A and B are intended to achieve a comfortable shifting with shifting times in the range of 500 to 1000 ms, the purpose of the strategy C is to shift in sporty manner with switching times of <200 ms.

The phase relationship of the strategies Aa, Ab, B and C are illustrated qualitatively in the FIGS. 7a to 7d. The solid lines in FIG. 7 represent the control signals of the starting or friction disconnection clutch. The dashed lines represent the control signals for the motor and generally represent the torque present at the input side of the transmission. The dot-dashed lines represent the control signals of the gear shift clutch of the old gear or the gear to be disengaged. The point lines finally represent the control signal of the synchronizer of the new gear or the gear to be engaged. An approximate zero line is indicated for the control signals in FIG. 7. For reasons of illustration, the control signal for the motor sometimes lies under the zero line.

Figure 7A:
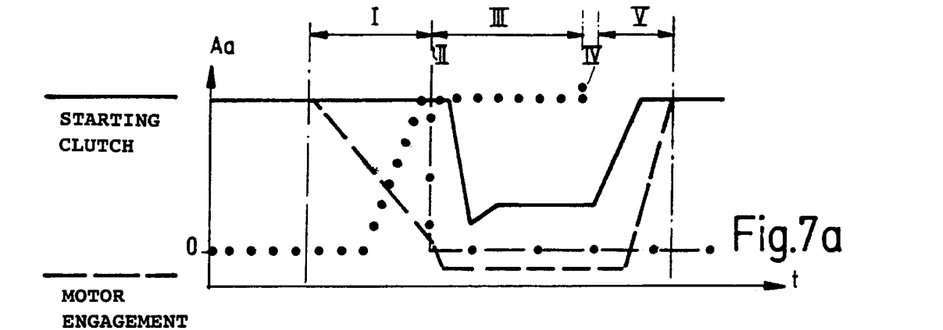
FIGS. 7a to 7d show diagrams of control signals as a function of time for performing various gear change strategies.

Initially, the phase diagram for the shifting strategy Aa will be discussed. At the beginning the clutch is closed, the old gear is engaged and the synchronizer of the new gear is load free. In phase I the torque of the motor declines. By actuating the synchronizer of the gear to be engaged, a torque transfer takes place, which leads to a load reduction of the gear to be disengaged. At the end of phase I the torque on the synchronizer is ideally equal to the motor torque (accounting for the gear ratio). The torque is less for a synchronizer suitable for shifting under partial load.

In phase II, the old gear is disengaged, as it is nearly or completely torque free. A matching of the speeds begins with the gear to be engaged. The torque on the synchronizer remains constant and the torque of the motor is further reduced. The difference in speeds at the synchronizer is reduced. The speed of the drive shaft cannot break out due to the excess torque on the synchronizer.

In phase III, matching speed is established with the gear to be engaged. To support the matching, the starting clutch is operated in slip condition. The difference in speeds and the gradient of the difference is controlled and regulated by actuating the starting clutch, i.e. by a variation of the slip torque.

In phase IV, the rotary speed at the gear to be engaged is within the desired window (a speed difference is generally allowable, in the limiting case the differential speed is 0). The new gear is engaged. Finally, in phase V the starting clutch is closed and synchronization of the motor results.

The goal of strategy Aa is to control and regulate the speed matching at the synchronizer through the slippage in the starting clutch, so that the speed difference goes to zero with a gradient which is as flat as possible. This should achieve a transition into the adhesion phase free of jolting.

Figure 7B:
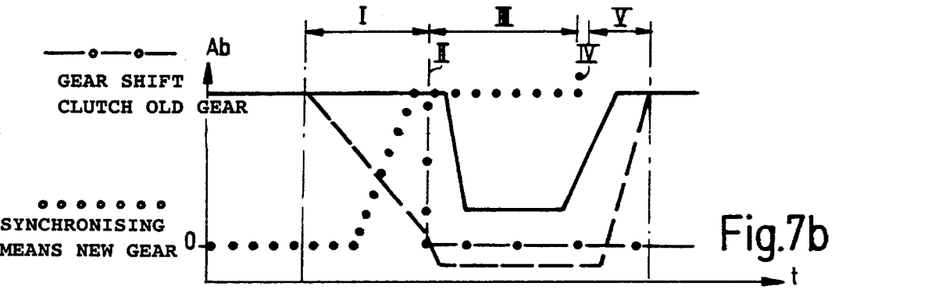

The shifting strategy Ab proceeds identically to the strategy Aa in the phases I, II, IV and V. In phase III, the starting clutch is actuated to support the speed matching and is controlled to have a defined slip torque. Before the positive engagement with the gear to be engaged is reached, i.e. before phase IV, the clutch is gradually closed again. In the ideal case, the torque decrease when transiting into the adhesion phase of the friction means is eliminated by increasing the slip moment.

In strategy Ab, a slip torque is adjusted to reduce the control and regulation needed for matching the speed difference at the synchronizer, which in any case allows a rapid matching of the speeds. The adhesion phase is reached with a comparatively steep gradient, which can lead to a jolt of the vehicle. This jolt can be reduced by an increase in the slip torque in the starting clutch in the phase III, optionally by controlling only, not regulating.

In the strategies A (i.e. Aa and Ab) a torque difference is adjusted between the starting clutch and the synchronizer. The torque excess at the synchronizer is employed to match the rotary speed of the input end and the output end masses.

Figure 7C:
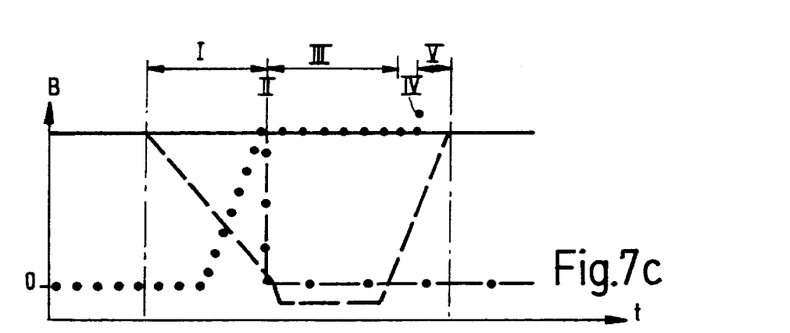

In the following, a gear change under strategy B is described with reference to FIG. 7c. In contrast to strategy A, the starting clutch is not actuated in strategy B. Otherwise, the procedure is similar to that of the strategy Aa and the differences will only be discussed briefly. It can be useful in phase II already to control or regulate the motor torque to the minimum value. In phase III, a torque decrease when transiting into the adhesion phase of the synchronizer is eliminated in the ideal case by increasing the motor torque.

The controlling means for strategy B are much less extensive than for strategy A, because only the synchronizer need be controlled. In addition, the sensitivity of the system to fluctuations in the torque at the synchronizer is less than in strategy A, because the masses to be synchronized are larger. However, slightly longer synchronization times may occur. The energy input into the synchronizer can also be greater.

Figure 7D:
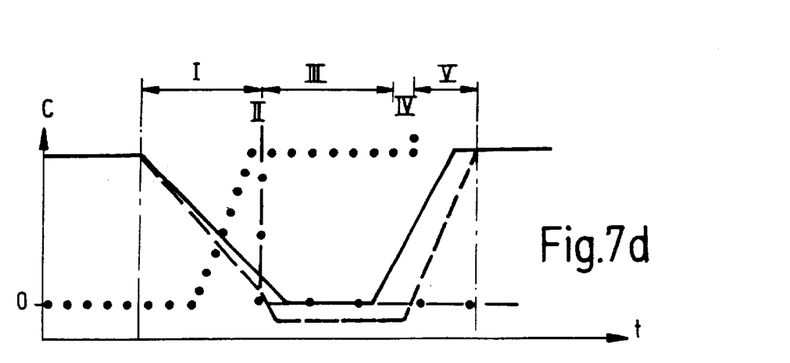

In the following, a gear change under the strategy C is described with reference to FIG. 7d. In phase I, the opening of the clutch and a decline in the motor torque takes place simultaneously or slightly time-delayed. At the same time, torque is transferred to the gear to be engaged by actuating the synchronizer, which reduces the load on the old gear. At the end of phase I, the torque at the synchronizer is approximately equal to the motor torque (accounting for the gear ratio). In this respect, the same holds for phase I as above in strategy Aa.

In phase II of strategy C, the old gear is disengaged, because it is nearly or completely torque free. The speed matching takes place at the gear to be engaged. The torque at the synchronizer remains constant and the speed difference is reduced.

In phase III, the speed matching at the gear to be engaged is further established, the clutch is initially completely open. At the end of phase III, before reaching the positive engagement at the gear to be engaged, the clutch is gradually closed again. In the ideal case, the torque decrease in transiting into the adhesion phase of the synchronizer is eliminated by increasing the slip torque.

In phase IV, the rotary speed at the gear to be engaged is within the desired window (a speed difference is allowable, in the limiting case the speed difference is "0"). The new gear is engaged. Following this, the starting clutch is completely closed and the motor becomes synchronized.

The strategy C is employed for sporty shifting and/or for "kickdown". Short shifting times are realized due to smaller masses to be synchronized and the overlapping type of shifting. A traction interruption takes place due to the completely opened starting clutch in parts of phase III. The interruption however can be kept extremely short.

An extremely flexible and optionally adaptive behavior can be achieved through the possibility of applying three basically different shifting strategies for one drive train, depending on the given boundry conditions.

It will be understood that the present invention is also applicable to transmissions with more or less than six forward gears. Furthermore, it is also applicable to transmissions designed for cross-wise assembly.

What is claimed is:

1. An automated drive train for a motor vehicle, comprising:
    a single friction clutch, which is actuatable by means of a first actuator and is connected at the input side with a motor of the vehicle,
    a step transmission which is connected to the output side of the friction clutch and comprises a first plurality of wheel sets for engaging and disengaging corresponding forward gears and a corresponding plurality of positive gear shift clutches, the gear shift clutches each having synchronization means and being actuatable by a second plurality of second actuators for engaging and disengaging the gears, wherein each of the synchronization means are suitable for synchronization under partial load, wherein at least one of the second actuators is configured to control two gear shift clutches, the two gear shift clutches are associated with gears not neighboring one another and two further gears lie between the two gears, and
    a controller for controlling the first actuator and the second actuators in coordination with one another, wherein the controller controls the actuators, such that at least one type of gear change takes place without the friction clutch being completely open.

2. An automated drive train for a motor vehicle, comprising:
    a single friction clutch, which is actuatable by means of a first actuator and is connected at the input side with a motor of the vehicle,
    a step transmission which is connected to the output side of the friction clutch and comprises a first plurality of wheel sets for engaging and disengaging corresponding forward gears and a corresponding plurality of positive gear shift clutches, the gear shift clutches each having synchronization means and being actuatable by a second plurality of second actuators for engaging and disengaging the gears, wherein the synchronization means comprise a cone synchronizer having a cone angle of more than 6°, and are suitable for synchronization under partial load, and
    a controller for controlling the first actuator and the second actuators in coordination with one another, wherein the controller controls the actuators, such that at least one type of gear change takes place without the friction clutch being completely open.

3. An automated drive train for a motor vehicle, comprising:
    a single friction clutch, which is actuatable by means of a first actuator and is connected at the input side with a motor of the vehicle,
    a step transmission which is connected to the output side of the friction clutch and comprises a first plurality of wheel sets for engaging and disengaging corresponding forward gears and a corresponding plurality of positive gear shift clutches, the gear shift clutches each having synchronization means and being actuatable by a second plurality of second actuators for engaging and disengaging the gears, wherein the synchronization means comprise a multi-disc synchronizer, and are suitable for synchronization under patial load, and
    a controller for controlling the first actuator and the second actuators in coordination with one another, wherein the controller controls the actuators, such that at least one type of gear change takes place without the friction clutch being completely open.

4. An automated drive train for motor vehicle, comprising:
    a single friction clutch, which is actuatable by means of a first actuator and is connected at the input side with a motor of the vehicle,
    a step transmission which is connected to the output side of the friction clutch and comprises a first plurality of wheel sets for engaging and disengaging corresponding forward gears and a corresponding plurality of positive gear shift clutches, the gear shift clutches each having synchronization means and being actuatable by a second plurality of second actuators for engaging and disengaging the gears, wherein each of the synchronization means are suitable for synchronization under partial load,
    a controller for controlling the first actuator and the second actuators in coordination with one another, wherein the controller controls the actuators, such that the drive train is controlled to carry out a gear change under one of three possible modes depending on the conditions of the gear change to be made, wherein the three possible modes of gear changes take place with an opened, a closed or with a slipping friction clutch, and wherein at least one of the second actuators is configured to control two gear shift clutches, the two gear shift clutches are associated with gears not neighboring one another and two further gears lie between the two gears.

5. An automated drive train for motor vehicle, comprising:
- a single friction clutch, which is actuatable by means of a first actuator and is connected at the input side with a motor of the vehicle,
- a step transmission which is connected to the output side of the friction clutch and comprises a first plurality of wheel sets for engaging and disengaging corresponding forward gears and a corresponding plurality of positive gear shift clutches, the gear shift clutches each having synchronization means and being actuatable by a second plurality of second actuators for engaging and disengaging the gears, wherein the synchronization means comprise a cone synchronizer having a cone angle of more than 6°, and are suitable for synchronization under partial load,
- a controller for controlling the first actuator and the second actuators in coordination with one another, wherein the controller controls the actuators, such that the drive train is controlled to carry out a gear change under one of three possible modes depending on the conditions of the gear change to be made, wherein the three possible modes of gear changes take place wit an opened, a closed or with a slipping friction clutch.

6. An automated drive train for motor vehicle, comprising:
- a single friction clutch, which is actuatable by means of a first actuator and is connected at the input side with a motor of the vehicle,
- a step transmission which is connected to the output side of the friction clutch and comprises a first plurality of wheel sets for engaging and disengaging corresponding forward gears and a corresponding plurality of positive gear shift clutches, the gear shift clutches each having synchronization means and being actuatable by a second plurality of second actuators for engaging and disengaging the gears, wherein each of the synchronization means comprise a multi-disc synchronizer, and are suitable for synchronization under partial load,
- a controller for controlling the first actuator and the second actuators in coordination with one another, wherein the controller controls the actuators, such that the drive train is controlled to carry out a gear change under one of three possible modes depending on the conditions of the gear change to be made, wherein the three possible modes of gear changes take place with an opened, a closed or with a slipping friction clutch.

* * * * *